United States Patent
Soulie et al.

(10) Patent No.: US 7,330,458 B2
(45) Date of Patent: Feb. 12, 2008

(54) METHOD FOR SYNCHRONIZING TERRESTRIAL NODES EQUIPPED WITH GNSS RECEIVERS AND BELONGING TO A TERRESTRIAL NETWORK

(75) Inventors: Antoine Soulie, Paris (FR); Pierre Dupuy, Paris (FR)

(73) Assignee: Evolium S.A.S., Paris (FR)

( * ) Notice: Subject to any disclaimer, the term of this patent is extended or adjusted under 35 U.S.C. 154(b) by 1227 days.

(21) Appl. No.: 10/237,956

(22) Filed: Sep. 10, 2002

(65) Prior Publication Data

US 2003/0058834 A1    Mar. 27, 2003

(30) Foreign Application Priority Data

Sep. 24, 2001    (EP)    ................... 01440313

(51) Int. Cl.
*H04L 3/06*    (2006.01)
(52) U.S. Cl. .................. 370/350; 370/503; 370/400
(58) Field of Classification Search .............. 370/320, 370/324, 335, 342, 515, 503, 507, 350
See application file for complete search history.

(56) References Cited

U.S. PATENT DOCUMENTS

| | | | |
|---|---|---|---|
| 5,402,424 A * | 3/1995 | Kou | ............... 370/324 |
| 5,838,669 A * | 11/1998 | Gerakoulis | ............... 370/320 |
| 6,104,729 A | 8/2000 | Hellum et al. | |
| 6,167,276 A | 12/2000 | Pite | |
| 6,684,077 B1 * | 1/2004 | Cosentino et al. | ........ 455/456.1 |
| 6,956,814 B1 * | 10/2005 | Campanella | ............... 370/210 |
| 2002/0135511 A1 * | 9/2002 | Zhao et al. | ........... 342/357.02 |
| 2005/0003833 A1 * | 1/2005 | Younis | ............... 455/456.1 |

FOREIGN PATENT DOCUMENTS

EP    0 803 994 A2    10/1997

* cited by examiner

*Primary Examiner*—Ricky Q. Ngo
*Assistant Examiner*—Dady Chery
(74) *Attorney, Agent, or Firm*—Sughrue Mion, PLLC

(57) ABSTRACT

A method and system for synchronizing terrestrial nodes equipped with GNSS (Global Navigation Satellite System) receiver belong to a terrestrial network. Synchronization is achieved by selecting terrestrial node to be synchronized to form a synchronization zone. The clear sky view solid angle shared by the terrestrial nodes is determined. The terrestrial nodes acquire a rough time reference sent by a satellite that can be viewed by the terrestrial nodes in the clear sky view solid angle. A common synchronization date is determined for all the terrestrial nodes. And, at the common synchronization date all the terrestrial nodes acquires a predefined sequence from the satellite. The terrestrial nodes uses this sequence to adjust the reference time.

8 Claims, 5 Drawing Sheets

METHOD FOR SYNCHRONIZING TERRESTRIAL NODES EQUIPPED WITH GNSS RECEIVERS AND BELONGING TO A TERRESTRIAL NETWORK

The invention is based on a priority application EP 01 440 313.3 which is hereby incorporated by reference.

BACKGROUND OF THE INVENTION

The present invention relates to radio communication networks and in particular to a method for synchronizing terrestrial nodes equipped with GNSS (Global Navigation Satellite System) receivers and belonging to a terrestrial network.

In terrestrial networks, especially radio communication networks, the synchronization of the different elements belonging to the network (i.e. base stations, mobile stations) is of crucial importance for a proper working of the network. Known methods for synchronization in a radio communication network consist in that the terrestrial nodes of the network communicate to synchronize. This kind of autosynchronization of a network is subject to the variations of the radio link quality. Moreover, the distance between the network nodes should be known with a high accuracy in order to deduce the transmission delay between the network nodes and obtain a good synchronization precision.

More precise synchronization may be obtained if the network nodes are additionally equipped with GNSS receivers. A GNSS system enables the synchronization of a terrestrial terminal with a common time reference shared by the satellites of the GNSS constellation. For a proper synchronization, GNSS signals emitted by three different satellites of the GNSS constellation have to be received simultaneously at the terrestrial terminal equipped with GNSS receiver. Then, it is a usual functionality of a GNSS receiver to correlate these 3 GNSS signals to estimate the local time.

However, this time reference acquisition procedure is long (about 1 minute) especially in urban area where the clear sky angle seen by the terrestrial station is reduced. Then, a configuration where 3 satellites can be viewed in this narrow clear sky angle is often long to be obtained.

Moreover, the accuracy of the estimated local time is limited by the accuracy of the time reference emitted by the satellite (e.g. 10-4 s).

A particular object of the present invention is to provide a method for synchronizing terrestrial terminals equipped with a GNSS receiver and belonging to a terrestrial network faster and with a higher accuracy than with the known prior art methods Another object of the invention is to provide a terrestrial node and adapted to perform such a synchronization method.

SUMMARY OF THE INVENTION

These objects, and others that appear below, are achieved by a method for synchronizing terrestrial nodes of a terrestrial network, said method comprising the steps of:
selecting terrestrial nodes which have to be synchronized to a common time reference, said terrestrial nodes forming a synchronization zone;
determining a clear sky view solid angle shared by said selected terrestrial nodes;
receiving at said selected terrestrial nodes a first time reference, herein called rough time reference, from a satellite of a global navigation satellite system viewed by said terrestrial nodes in said clear sky view solid angle;
setting an internal time reference in each of said selected terrestrial nodes to said rough time reference;
calculating a common synchronization date (for all selected terrestrial nodes to receive a predefined sequence sent by said or another satellite viewed by said terrestrial nodes in said clear sky view solid angle;
determining, at each of said selected terrestrial nodes, a time difference between time of reception of said predefined sequence as indicated by the internal time reference of the respective node and said common synchronization date;
fine tuning the internal time reference of each of said selected terrestrial nodes taking into account said time difference.

With regard to the node, these objects are achieved by a terrestrial node comprising:
a GNSS receiver part for receiving a time reference, herein called rough time reference, and a predefined sequence from a satellite of a global navigation satellite system;
a terrestrial network part for communicating with a terrestrial network;
an interface between said GNSS receiver part and said terrestrial network part for forwarding information obtained in said GNSS receiver part to said terrestrial network,
said terrestrial node comprising:
means for acquiring a predefined sequence at a synchronization date calculated by said terrestrial network.
means for setting an internal time reference to said rough time reference;
means for determining a time difference between time of reception of said predefined sequence as indicated by the internal time reference and a predefined common synchronization date;
means for fine tuning said internal time reference taking into account said time difference According to the present invention, synchronization zones comprising terrestrial nodes that have to be synchronized are defined in the terrestrial network. Then, in a first step, all terrestrial nodes located in the chosen synchronization zone acquire a time reference (GNSS signal) sent by one satellite currently positioned in the clear sky view solid angle shared by all terrestrial nodes.

In a second step, the terrestrial network determine a common synchronization date and indicates it to the terrestrial nodes which have to get synchronized. When this common synchronization date happens, all terrestrial nodes in the chosen synchronization zone acquire a predefined sequence sent by a satellite. The residual synchronization error remaining after the acquisition of the rough time reference is compensated after the acquisition of the predefined sequence by all the terrestrial nodes. The precision of the time reference is in this case equal to the precision with which the predefined time sequence is repeated in the Global Navigation Satellite System.

The method according to the present invention presents the advantage to require the presence of only one satellite in the clear sky view angle shared by all terrestrial nodes that have to get synchronized. As a consequence, the delay for the terrestrial nodes to get synchronized is reduced.

Another advantage is that the cooperation of the GNSS system with the terrestrial network in the synchronization procedure enables it to get a higher accuracy of the synchronization.

In a further embodiment of the present invention this synchronization method is used in a method for determining the position of a mobile station in a radio communication network, when this mobile station is also equipped with a GNSS receiver.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1A:
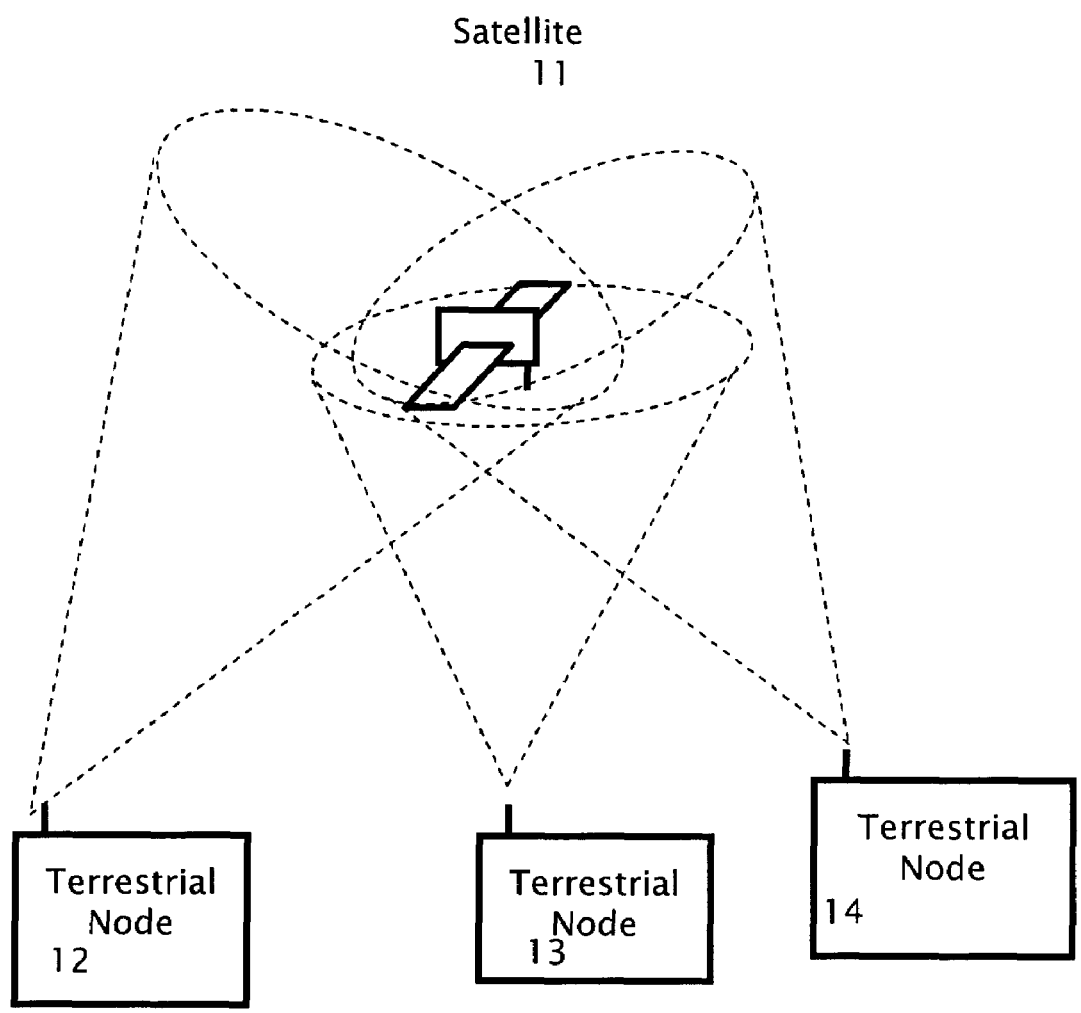
FIGS. 1a, 1b shows a simplified system comprising a satellite belonging to a GNSS system and terrestrial nodes belonging to a terrestrial network where the method according to the present invention can be used.

FIG. 1a shows a simplified system comprising a satellite 11 belonging to a GNSS system and three terrestrial nodes 12, 13, 14 belonging to a terrestrial network where the synchronization method according to the present invention can be used.

In the framework of the present invention, the term GNSS system refers to any constellation of satellites dedicated to broadcast time reference information and predefined data sequence. Such a GNSS system may be constituted by the satellites belonging to a GPS system, any satellite constellation system as Gallileo is also adapted to apply the method according to the present invention.

Satellite 11 is comprised in the clear sky view angle shared by terrestrial nodes 12, 13, 14 (i.e. there are no obstacles between satellite 11 and terrestrial nodes 12, 13, 14 which presents the reception from information sent by satellite 11).

Terrestrial nodes 12, 13, 14 comprise a GNSS receiver part and a terrestrial network part. An interface between the GNSS receiver part should be provided to forward information from the GNSS receiver part to the terrestrial network part.

Figure 1B:
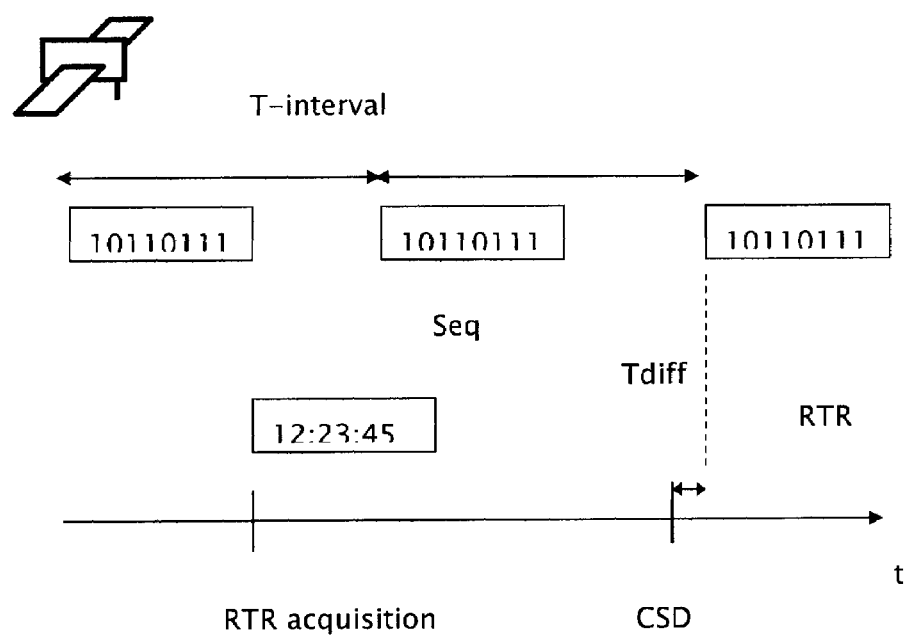

The GNSS receiver part comprises usual GNSS receiver functionality as a time reference acquisition module for detecting a time reference, herein called rough time reference RTR, sent by the satellite of the constellation (FIG. 1b). The rough time reference RTR is preferably an absolute time indication. Furthermore, the GNSS receiver part comprises a predefined sequence acquisition module for detecting a predefined sequence, Seq, broadcast by the satellite at regular time intervals T-interval.

The terrestrial network part comprises usual functionality of a terrestrial network. Preferably, the terrestrial network comprises a central master node controlling the different terrestrial nodes 12, 13, 14.

The terrestrial nodes 12, 13, 14 also comprises an internal clock which can be shared between the GNSS receiver part and the terrestrial network part. It is the purpose of the present invention to provide a method for evaluating the difference of the internal clocks and then for aligning the internal clocks of terrestrial nodes 12, 13, 14.

Figure 2:
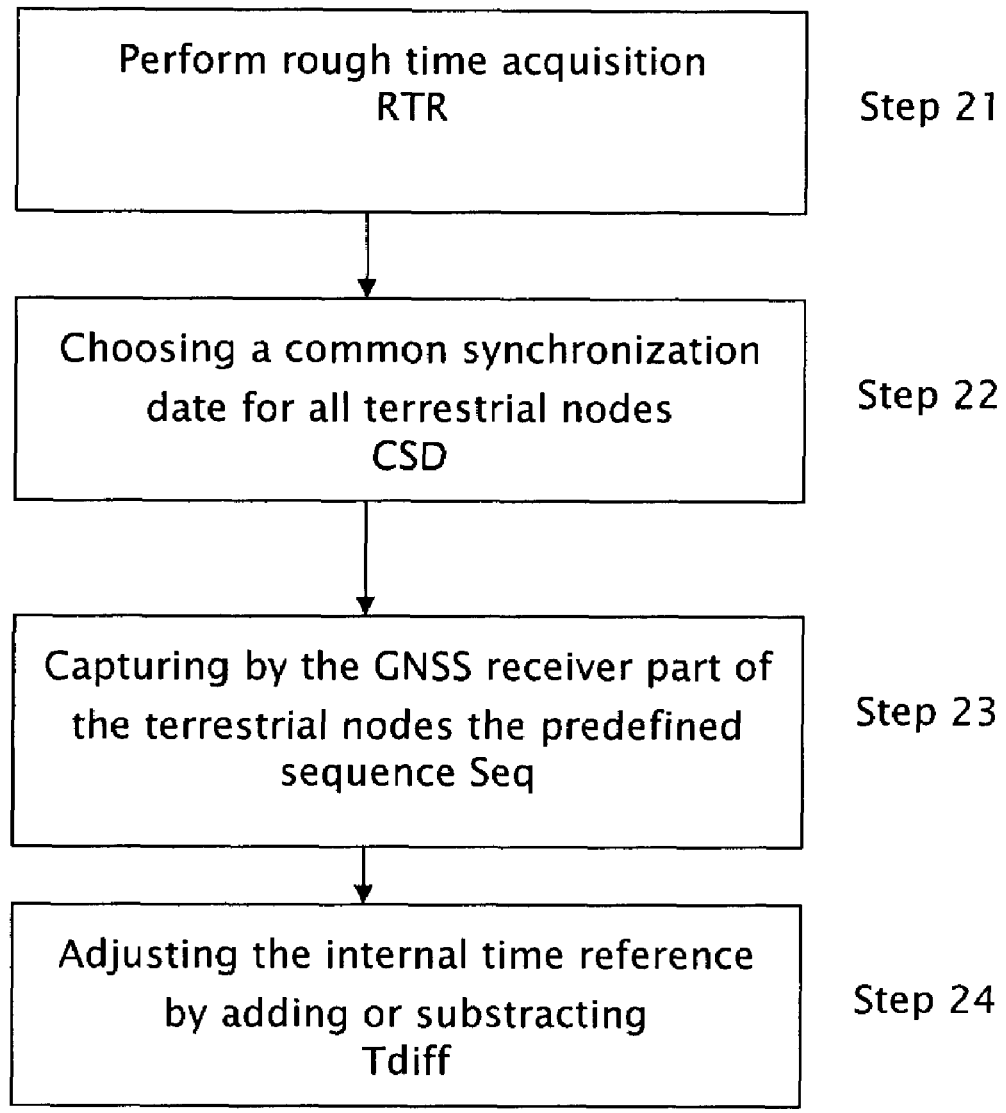
FIG. 2 shows a flow diagram describing the steps of the method according to the present invention.

FIG. 2 shows a flow diagram describing the steps 21 to 25 of the method according to the present invention;

At step 21, the GNSS receiver parts of terrestrial nodes 12, 13, 14 perform a rough time reference acquisition by setting its internal time reference to the time reference RTR broadcast by a satellite 11 located in the clear sky view angle shared by all terrestrial nodes 12, 13, 14. For this purpose, the satellite may broadcast together with the rough time reference its identification so that terrestrial nodes 12, 13, 14 can check if the received rough time reference comes from the same satellite. This check may also be performed at the central node of the terrestrial network if terrestrial nodes 12, 13, 14 reports the appropriate information to the central node. The rough time reference acquisition is a standard GNSS procedure having usually an accuracy of 10-4second.

The internal clock of the terrestrial nodes 12, 13, 14 is set to this rough time reference.

Step 22 consists in choosing a common synchronization date for all terrestrial nodes 12, 13, 14. This common synchronization date is preferably computed at the central node of the terrestrial network and communicated to terrestrial nodes 12, 13, 14. The determination of the common synchronization date takes into account the time interval T-interval and the presence of a satellite of the satellite constellation in the clear sky view angle shared by the terrestrial nodes 12, 13, 14.

Step 23 consists in capturing by the GNSS receiver part of the terrestrial nodes 12, 13, 14 the predefined sequence Seq transmitted by the satellite 11 at the common synchronization date CSD. The predefined sequence Seq is a unique pattern known at the GNSS receiver part. This may be the GNSS satellite code, or a known CDMA sequence. Due to the relative inaccuracy of the rough time reference, the common synchronization date CSD does not correspond exactly to the beginning of the predefined sequence. The terrestrial node should determine the time difference Tdiff between the common synchronization date and the effective reception of the predefined sequence.

Step 24 consists in adjusting the internal time reference by taking into account the time difference Tdiff. The internal time adjustment consists in adding or subtracting Tdiff from the internal time reference depending if the predefined sequence Seq is received before or after the common synchronisation date The predefined sequence acquisition enables it to obtain a synchronization accuracy better than 10-6 seconds.

For further refining the synchronization accuracy, the terrestrial nodes 12, 13, 14 can determine the view angle with which they see the satellite 11 at the common synchronization date and, as a consequence, take into account different propagation delays of the predefined sequence Seq to the different terrestrial nodes 12, 13, 14. The determination of the view angle with which a GNSS receiver see a satellite at a predefined date is a standard GNSS function which should be contained in the GNSS receiver part of terrestrial node 12, 13, 14.

To summarize, the first rough time reference acquisition is supposed to be accurate enough to enables terrestrial nodes 12, 13, 14 to capture the same version of predefined sequence Seq and not different ones emitted T-interval seconds after or before which would lead to an erroneous synchronization at step 23 and 24. Then, the accurate synchronization is obtained in adjusting the time reference at the acquisition of the predefined sequence Seq.

For sake of simplicity, the synchronization method according to the present invention is described in the simplified case where three terrestrial nodes 12, 13, 14 have to be synchronized together. It will be clear for a person skilled in the art that the present embodiment can be easily applied to any number of terrestrial nodes provided that they are located in a synchronization zone having an appropriate size. Appropriate size means that the clear sky view solid angle shared by the terrestrial nodes to synchronize in the synchronization zone should be large enough to ensure that a satellite belonging to the GNSS system enters this solid angle often enough to enables synchronization. Typical diameters for the synchronization zone size are extending from a diameter of 20 km in landscape area to a diameter of less than 1 km in dense urban area.

In order to synchronize a larger terrestrial network, several synchronization zones should be defined in the terrestrial network. Moreover each synchronization zone is synchronized independently of the other synchronization zones, since only synchronization at the scale of a synchronization zone is provided.

In a preferred embodiment of the synchronization method, at least one terrestrial station of each synchronization zone belongs to at least two synchronization zones and maintains as many time reference as synchronization zones it belongs to. This enables to synchronize the terrestrial nodes at the scale of the terrestrial network. Preferably, the contends of the synchronization zones is maintained and controlled at the central node of the terrestrial network.

Figure 3:
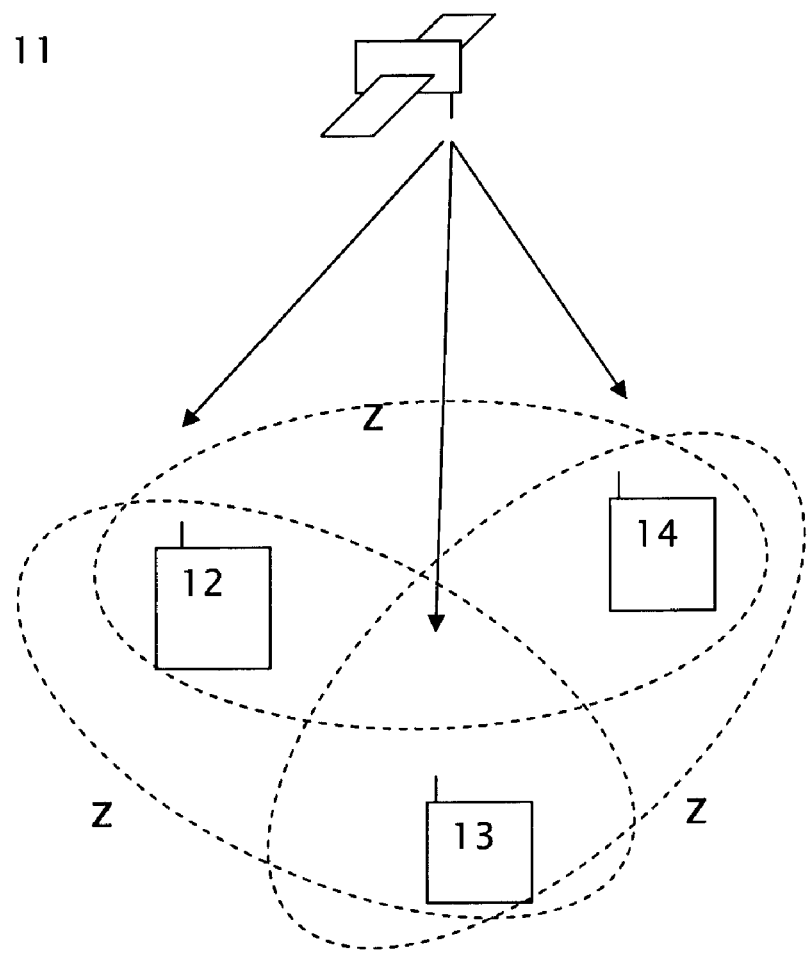
FIG. 3 shows a preferred embodiment for the use of the method according to the present invention.

FIG. 3 shows a preferred embodiment of the method according to the present invention. For a high synchronization accuracy and synchronization delay, each synchronization zone comprises two terrestrial nodes and each terrestrial node maintains two time references. This embodiment enables it to have the largest clear sky view solid angle since it is shared by only two terrestrial stations. As a consequence the synchronization delay is reduced since a satellite of the constellation will enter the clear sky view solid angle shared by the two terrestrial nodes faster.

The terrestrial network is preferably a cellular radio communication network, the terrestrial nodes being base stations of the cellular network to be synchronized together, the central node being for example a BSC available in each cell of the network.

Figure 4:
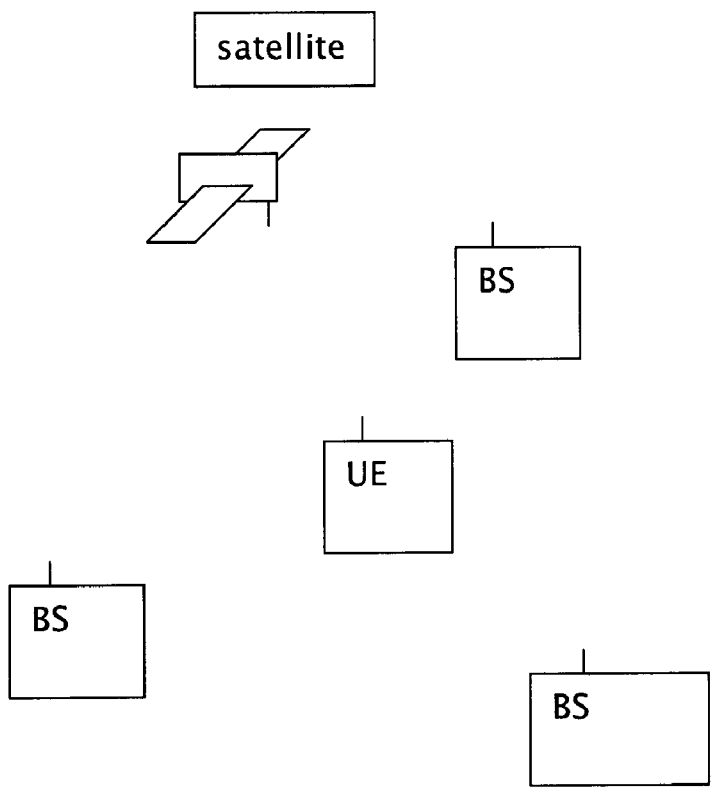
FIG. 4 shows a system where the method according to the present invention can be used for localization purpose.

FIG. 4 shows a system where the method according to the present invention can be used for localization purpose in a method for determining the position of a mobile station in a radio communication network.

In this preferred embodiment, the terrestrial nodes to be synchronized together are at least three base stations and one mobile terminal of a cellular radio communication network. The mobile terminal as well as the base stations are equipped with a GNSS receiver part.

When the three base stations and the mobile station have been synchronized with the synchronization method according to the present invention, an estimated position of the mobile terminal can be obtained by using a usual triangulation method as for example the TOA (time of arrival) method.

The TOA method to give good results if the different nodes, i.e. the base stations and the mobile terminal are perfectly synchronized.

For more accurate results of the localization, it is possible to repeat the different steps of the localization method several time. For each iteration, the current localization of the mobile terminal will be more accurate then the synchronization of the three base stations and the mobile station will also be more accurate and then the localization of the mobile terminal with the TOA method will also be more precise.

The iterative process may be stopped when a predefined level of precision is reached or after a predefined time duration since the mobile terminal may move what would limit the obtained accuracy.

A rough estimated position of the mobile station is used in the synchronization method. This rough estimated position of the mobile terminal can be obtained thanks to usual positioning methods well known from a person skilled in the art. Alternatively, the rough estimation may also be arbitrarily deduced from the positions of three surrounding base stations. Usually the position of the base stations are fixed parameters known in a central entity of the terrestrial network. Alternatively, the rough estimation of the position of the mobile station may be directly obtained as a GNSS system functionality.

To refine even more the localization method described above, the system might be connected to a GIS (Geographic Information System) containing information on the elevation of geographic locations in an area. Knowing roughly the location of the mobile user, its elevation may be obtained by interrogating the GIS. The difference of elevation between the three base stations and the mobile station location is taken into account to evaluate the difference of propagation time between the satellite and the terrestrial nodes. Then, the synchronization is more accurate and the location of the mobile station obtained with the TOA method is also more accurate. In this embodiment of the method several iterations of the different steps increase also the accuracy of the localization.

The invention claimed is:

1. A method for synchronizing terrestrial nodes of a terrestrial network, said method comprising the steps of:
   selecting terrestrial nodes which have to be synchronized to a common time reference, said terrestrial nodes forming a synchronization zone;
   determining a clear sky view solid angle shared by said selected terrestrial nodes;
   receiving at said selected terrestrial nodes a rough time reference from a satellite of a global navigation satellite system viewed by said terrestrial nodes in said clear sky view solid angle;
   setting an internal time reference in each of said selected terrestrial nodes to said rough time reference;
   calculating a common synchronization date (for all selected terrestrial nodes to receive a predefined sequence sent by said or another satellite viewed by said terrestrial nodes in said clear sky view solid angle;
   determining, at each of said selected terrestrial nodes, a time difference between time of reception of said predefined sequence as indicated by the internal time reference of the respective node and said common synchronization date;
   fine tuning the internal time reference of each of said selected terrestrial nodes taking into account said time difference.

2. The method according to claim 1, where said terrestrial nodes are base stations of a terrestrial cellular radio communication network, said base stations comprising a GNSS receiver for receiving information from said satellite.

3. The method according to claims 1, where the number of terrestrial nodes per synchronization zone is chosen so that the clear sky view angle shared by said terrestrial nodes is smaller than a predefined threshold, at least one terrestrial node of said synchronization zone additionally belonging to at least one adjacent synchronization zone and maintaining as many time references as synchronization zones it belongs to.

4. The method according to claim 3, where each synchronization zone comprises two terrestrial nodes.

5. A method for determining the position of a mobile station in a radio communication network, said mobile comprising means for receiving information from a satellite belonging to a global navigation satellite system, said radio communication network also comprising base stations comprising means for receiving information from a satellite belonging to a global navigation satellite system, said method comprising the steps of
- selecting in said radio communication network at least two base stations located close to said mobile station, said base stations and mobile station being herein called terrestrial stations;
- determining a clear sky view solid angle shared by said selected terrestrial stations;
- receiving at said selected terrestrial stations a rough time reference from a satellite of a global navigation satellite system viewed by said terrestrial stations in said clear sky view solid angle;
- setting an internal time reference in each of said selected terrestrial stations to said rough time reference;
- calculating a common synchronization date for all selected terrestrial stations to receive a predefined sequence sent by said or another satellite viewed by said terrestrial stations in said clear sky view solid angle;
- determining, at each of said selected terrestrial stations, a time difference between time of reception of said predefined sequence as indicated by the internal time reference of the respective station and said common synchronization date;
- fine tuning the internal time reference of each of said selected terrestrial stations taking into account said time difference;
- determining the position of said mobile station according to a triangulation method applied to said base stations and said mobile station.

6. The method according to claim 5, where steps 2 to 8 are repeated a predefined number of times.

7. The method for determining the position of a mobile station according to claim 5, further comprising the step of estimating the elevation of said mobile station by means of a Geographical Information System coupled to said terrestrial network.

8. A terrestrial node comprising:
- a GNSS receiver part for receiving a rough time reference and a predefined sequence from a satellite of a global navigation satellite system;
- a terrestrial network part for communicating with a terrestrial network;
- an interface between said GNSS receiver part and said terrestrial network part for forwarding information obtained in said GNSS receiver part to said terrestrial network, said terrestrial node comprising:
- means for acquiring a predefined sequence sent by said satellite or another satellite viewed by said terrestrial nodes at a synchronization date calculated by said terrestrial network;
- means for setting an internal time reference to said rough time reference;
- means for determining a time difference between time of reception of said predefined sequence as indicated by the internal time reference and a predefined common synchronization date; and
- means for fine tuning said internal time reference taking into account said time difference.

* * * * *